United States Patent
Helot et al.

[11] Patent Number: 5,823,651
[45] Date of Patent: Oct. 20, 1998

[54] DISPLAY ADAPTER FOR OVERHEAD PROJECTOR PRESENTATION

[76] Inventors: Jacques H. Helot, 3429 SW. Hil-wood Pl., Corvallis, Oreg. 97333; Michael D. Derocher, 2719 NW. Romancier Dr., Corvallis, Oreg. 97330

[21] Appl. No.: 726,598

[22] Filed: Oct. 7, 1996

[51] Int. Cl.⁶ .................................................. G03B 21/14
[52] U.S. Cl. .................. 353/120; 353/119; 348/917
[58] Field of Search ........................... 353/97, 120, 122, 353/DIG. 5, 119, DIG. 3; 248/917, 918, 924, 919

[56] References Cited

U.S. PATENT DOCUMENTS

| | | | |
|---|---|---|---|
| 4,728,184 | 3/1988 | Kyhl | 353/DIG. 5 |
| 4,921,343 | 5/1990 | Ushiro et al. | 353/66 |
| 4,944,578 | 7/1990 | Denison | 350/347 |
| 4,968,134 | 11/1990 | Shimizu et al. | 353/119 |
| 5,041,965 | 8/1991 | Chen | 364/200 |
| 5,168,294 | 12/1992 | Davis et al. | 353/97 |
| 5,214,459 | 5/1993 | Al-Ani | 353/88 |
| 5,227,820 | 7/1993 | Miyashita et al. | 353/122 |
| 5,260,730 | 11/1993 | Williams et al. | 353/DIG. 3 |
| 5,317,350 | 5/1994 | Nomura et al. | 353/65 |
| 5,337,103 | 8/1994 | Gulick | 353/119 |
| 5,353,075 | 10/1994 | Conner et al. | 353/122 |
| 5,521,660 | 5/1996 | Hodson et al. | 353/122 |
| 5,593,221 | 1/1997 | Evanicky et al. | 353/DIG. 3 |
| 5,668,695 | 9/1997 | Nakamura et al. | 353/DIG. 5 |

Primary Examiner—William Dowling

[57] ABSTRACT

A display adapter adapts a display, such as a laptop display, to a projector display panel for use with an overhead projector. The laptop display is detached from a laptop CPU and physically and electronically connected to the adapter. The display adapter has a parallel conductor and electronic interfacing circuitry to interface the display with the computer CPU via the parallel port of the laptop. The adapter has an enclosure with a central body and two extendible sleeves slidably mounted to the body to move between an expanded position and a collapsed position. In the expanded position, the sleeves project outward from the body in opposing directions. In the collapsed position, the sleeves are slid inward relative to the body toward each other to an abutting relationship. The enclosure also has two support arms movably mounted to the first and second sleeves, respectively, to move between an opened position and a closed position. When the adapter is arranged with the sleeves in their expanded position and the arms in their opened position, the display mounts to the adapter and is supported horizontally by the support arms a safe distance from the projector light surface to prevent overheating. The extended sleeves cover one entire side area of the projector light surface adjacent to the display to block all peripheral bright spots left uncovered by the display. The adapter body has a recess sized to hold a remote control handset, such as an IR device. When the sleeves are extended to the expanded position, the recess is exposed to permit removal and replacement of the IR device. An IR port is formed in the body and exposed when the sleeves are extended to receive IR signals from the IR device.

20 Claims, 4 Drawing Sheets

DISPLAY ADAPTER FOR OVERHEAD PROJECTOR PRESENTATION

TECHNICAL FIELD

This invention relates to display adapters for displays, such as detachable LCD screens from portable computers, to adapt the displays for use with overhead projectors.

BACKGROUND OF THE INVENTION

Many people are familiar with overhead projectors which focus and reflect a light source onto a large, white, fabric screen or wall. The overhead projectors are used frequently for presentations to large groups. Traditionally, a presenter has relied on pre-made slides which consist of words or drawings formed on a clear plastic film. During the presentation, each slide is hand laid on the projector and the slide content is projected onto the large projection screen. Film slides are not very convenient to work with because they require manual handling during presentation. The presenter is thus forced to stay near the projector during the lecture and hand change each slide. Additionally, to edit a slide's content, a new film slide must be produced and then organized within the ordered slides to replace the old slide.

In recent years, presenters have begun using computerized projector display panels in place of film slides. The projector display panels have a flat LCD (liquid crystal display) panel which is transparent and open on both sides to pass light from the projector. The panel is framed within an enclosure which houses electronics for interfacing the panel to a computer, such as a laptop.

Like the traditional film slides, the computerized projector display panel rests atop the projector. Electronically stored slides are depicted on the LCD panel during the presentation. Light is directed through the transparent LCD panel, projecting the slide content onto the projection screen. With this technology, a presenter can create a more dynamic presentation using video, graphic animation, enhanced colors, programmable slide timing, and sound synchronization. The presenter can also control the presentation from a remote location using a remote control device, freeing the presenter to walk away from the projector. With electronic slides, the user can also edit the slide content and presentation order directly on the computer, without having to prepare new physical slides. Conventional projector display panels have a few drawbacks. One drawback is that the dimensions of some display panels do not correspond to the dimensions of the projector light surface. The computerized display is often smaller, leaving uncovered one or more areas of the projector light surface which result in unwanted bright regions on the projection screen.

To address this problem, U.S. Pat. No. 5,227,820 to Miyashita et al. describes a shading device for an projector display panel. The shading device has two opaque plates that slide outward beyond the periphery of the LCD panel to cover the areas of the projector light surface that are left uncovered by the panel. Similarly, U.S. Pat. No. 5,337,103 to Gulick describes an overhead projection display panel having members that fold or slide out to cover unmasked areas of the projector light surface.

Another drawback with computerized projector display panels, however, is that they are expensive. Each requires its own LCD panel. Additionally, projector display panels are bulky and often heavy, making them not very conducive for portability.

Another drawback is that projector display panels require the presenter to carry, in addition to the portable computer, the following separate items: (1) projector screen, (2) remote control device, (3) dongle with IR (infrared) receiver connected to the portable computer, and (4) cable from portable computer to the display panel. If one of these items is forgotten or lost, the presenter may be unable to make a computerized presentation, or at least will not be able take advantage of the remote control capabilities.

To address some of these problems, U.S. Pat. No. 5,041,965 to Chen describes a laptop computer with a detachable display for use with an overhead projector. The display has a detachable cover that is attached when the display is used as a monitor and detached when the display is used as a projector panel. By using the laptop display, a separate projector display panel is not needed, thereby eliminating its cost. Moreover, the presenter only needs to transport the laptop computer, as opposed to a portable computer plus the projector display panel.

While use of the laptop display is perhaps more convenient than a projector display panel, the detachable laptop display has a similar problem in that it does not entirely cover the projector light surface, leaving the unwanted bright spots on the projection screen which can spoil a presentation. Another drawback is that the display is placed directly atop the projector light surface. During the presentation, the covered area becomes increasingly hotter and may cause damage to both the laptop display and the projector.

SUMMARY OF THE INVENTION

This invention concerns a display adapter which adapts a display, such as a laptop LCD, to provide a computerized projector display panel. The display is physically and electrically connected to the adapter. The display adapter has a parallel cable and electronic interfacing circuitry to interface the display with a computer.

The adapter has an enclosure with a central body and two extendible sleeves slidably mounted to the body. The sleeves move between an expanded position and a collapsed position. In the expanded position, the sleeves project outward from the body in opposing directions. In the collapsed position, the sleeves are slid inward relative to the body toward each other to an abutting relationship.

The enclosure also has two support arms movably mounted to the first and second sleeves, respectively. The support arms move between an opened position and a closed position. In one implementation, the arms are pivotally mounted to outer ends of the sleeves to swing between the opened and closed positions.

During use, the adapter is arranged with the sleeves in their expanded position and the arms in their opened position. The display is physically and electronically coupled to the adapter. The display is supported horizontally by the support arms a safe distance above the projector light surface to prevent overheating. The extended sleeves cover one entire side of the projector light surface and the display covers the remaining surface areas. In this manner, the combined assembly blocks are light areas, thereby preventing projection of unwanted bright spots on a projection screen.

The adapter body has a recess sized to hold a remote control handset, such as an IR device. When the sleeves are in the expanded position, the recess is exposed to permit removal and replacement of the IR device. An IR port is formed in the body and exposed when the sleeves are extended to receive IR signals from the IR device. During transportation, the sleeves cover and protect the IR device.

A view aperture is formed in one or both of the sleeves to permit a view of the recess so that a user can visually confirm the presence or absence of the IR device.

The display adapter thus integrates into one device all of the components used in conjunction with a portable computer to conduct a computerized overhead projector presentation.

BRIEF DESCRIPTION OF THE DRAWINGS

FIG. 1 shows the display adapter in a collapsed position.

DETAILED DESCRIPTION OF THE PREFERRED EMBODIMENT

Figure 1:
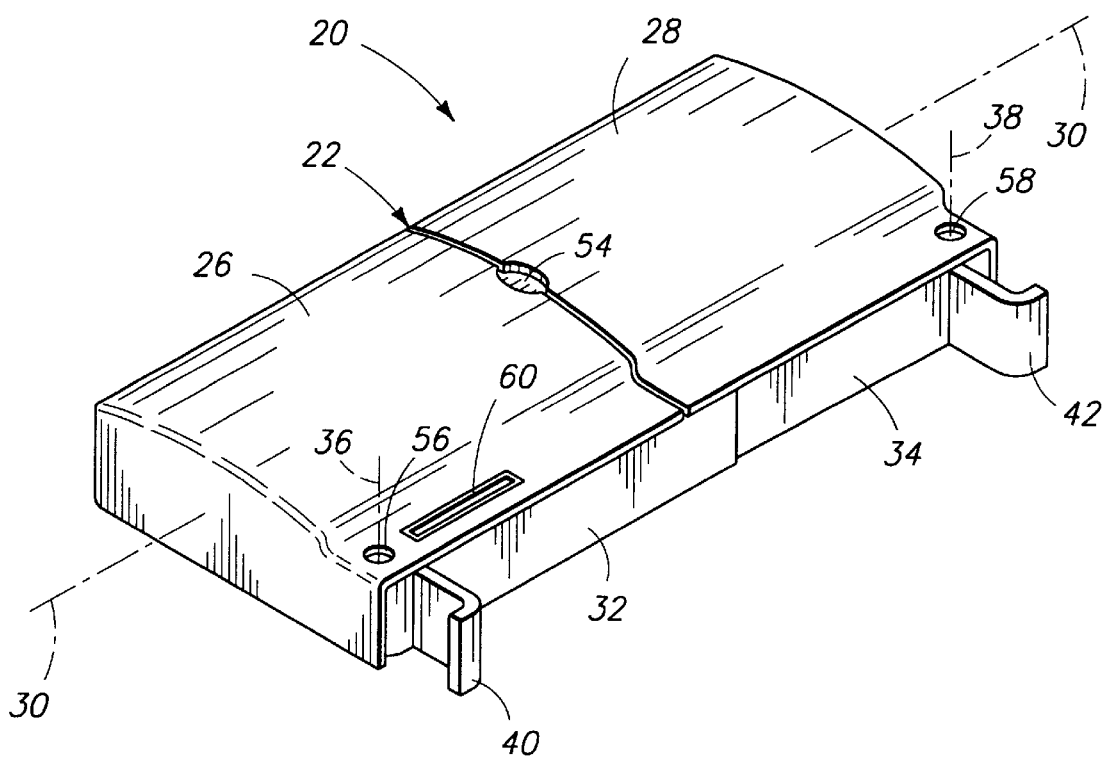
FIG. 1 is an isometric view of a display adapter for an overhead projector.
Figure 2:
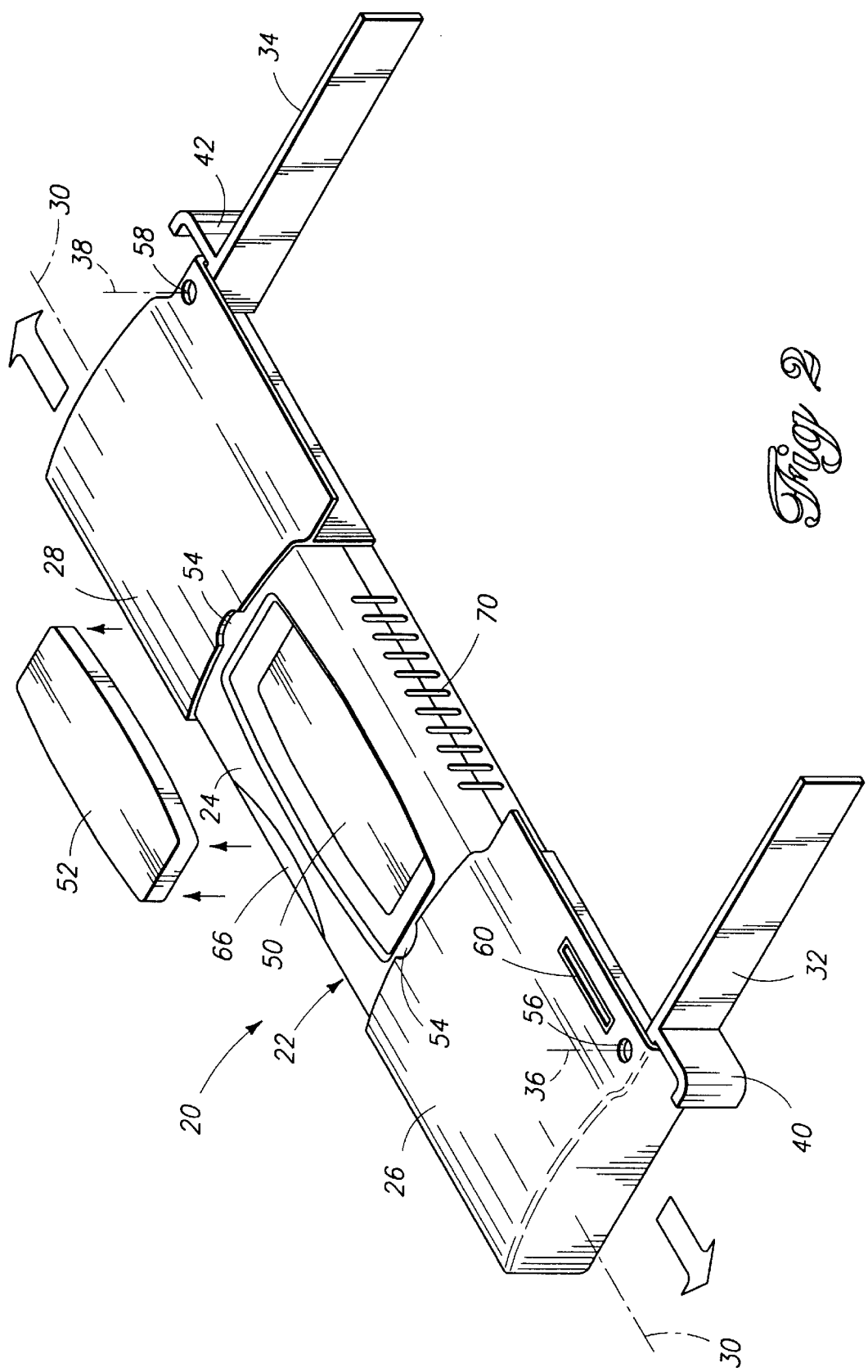
FIG. 2 is an isometric view showing the display adapter in an expanded position.

FIGS. 1 and 2 show a display adapter 20 which adapts a display for use with an overhead projector. The adapter 20 physically supports the display above the projector light surface and electronically interfaces the display with a separate computing unit.

The display adapter 20 has an enclosure 22 with a central body 24 and two extendible sleeves 26, 28 slidably mounted to the body 24. The sleeves 26, 28 move between a collapsed position shown in FIG. 1 and an expanded position shown in FIG. 2. In the collapsed position, the sleeves are slid inward relative to the body 24 to an abutting relationship to cover at least part, and preferably all, of the body 24. In the expanded position, the sleeves 26, 28 are extended outward from the body 24 in opposing directions along a central, elongated axis 30 to expose the body 24.

The enclosure 22 has a first support arm 32 movably mounted to the first sleeve 26 and a second support arm 34 movably mounted to the second sleeve 28. The arms 32, 34 move between a closed position and an open position. In the illustrated implementation, the support arms 32, 34 are pivotally mounted to outer ends of the first and second sleeves 26, 28 to pivot about pivot axes 36, 38, respectively. The pivot axes 36, 38 are transverse, and preferably perpendicular, to the central elongated axis 30. In this manner, the support arms 32, 34 alternately fold together against the sleeves in the closed position (FIG. 1) or unfold outward through 90° angles to the opened position (FIG. 2). Stops 40, 42 are formed on arms 32, 34, respectively, to prevent over rotation past an approximately 90° angle. In the opened position, the support arms 32, 34 are approximately perpendicular to the axis 30.

It is noted that other constructions may be used to moveably mount the arms to the sleeves. For instance, the arms might be formed to slide or telescope from the ends of the sleeves in a direction perpendicular to the central axis 30. As another alternative, the arms can be detachably connected to the sleeves in which the sleeves are detached and stored in the enclosure in the closed position and attached to extend perpendicularly from the sleeves in the opened position. The arms might also be operably mounted to the display.

The enclosure body 24 has a recess 50 formed in the upper surface (FIG. 2). The recess 50 is sized to hold a remote control handset 52, such as a remote control IR (Infrared) device, a remote control RF (radio frequency) device, or the like. The recess 50 is exposed when the sleeves 26, 28 are in the expanded position (FIG. 2). This permits a presenter to remove the IR handset 52 and use it for the presentation. Afterward, the presenter returns the IR handset 52 to the recess 50 and slides the sleeves 26, 28 back over the recess and IR handset to the collapsed position (FIG. 1). In this manner, the IR handset 52 is protected within the enclosure 22 during transportation. A view opening 54 is formed in at least one sleeve to provide a view of the recess 50. This allows the user to visually verify that the IR device 52 is safely housed within the enclosure 22 when the first and second sleeves are in the collapsed position. In the illustrated implementation, the view opening is formed partly in both sleeves, which together form an approximately annular view hole; but, other aperture constructions are possible.

Figure 4:
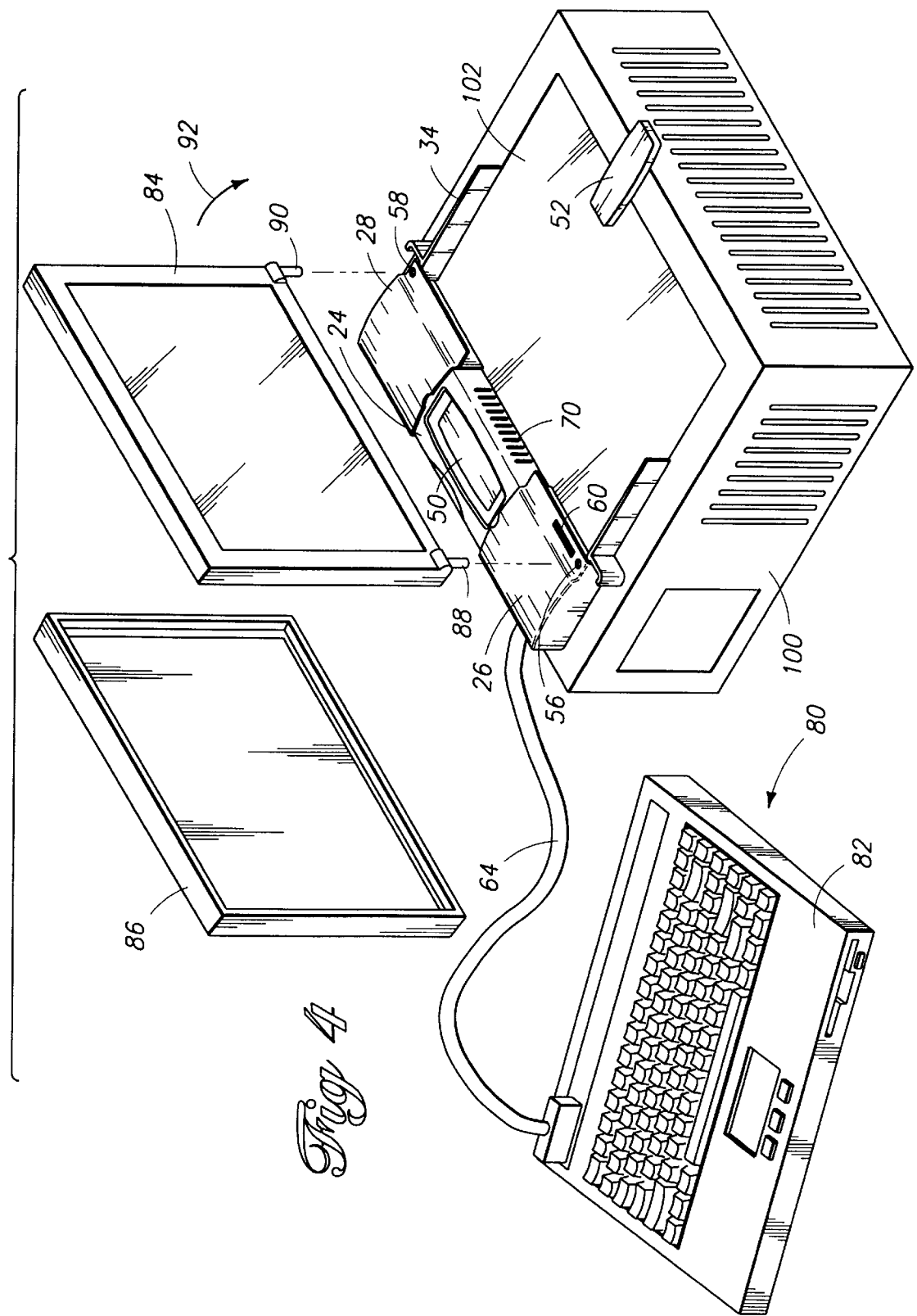
FIG. 4 is an isometric view of the display adapter being used with a laptop computer to form a computerized presentation display unit.

The adapter enclosure 22 has two mounting apertures 56 and 58 which physically receive the mounting posts on the display. The posts are inserted into the apertures 56 and 58 when the display is supported by the adapter, as is illustrated in FIG. 4. The enclosure 22 also has an electrical connector 60 to connect to a compatible connector on the display. In the illustrated implementation, the connector 60 is positioned in the first sleeve 26 to accommodate a detachable laptop display, as is described below in more detail with reference to FIG. 4.

Figure 3:
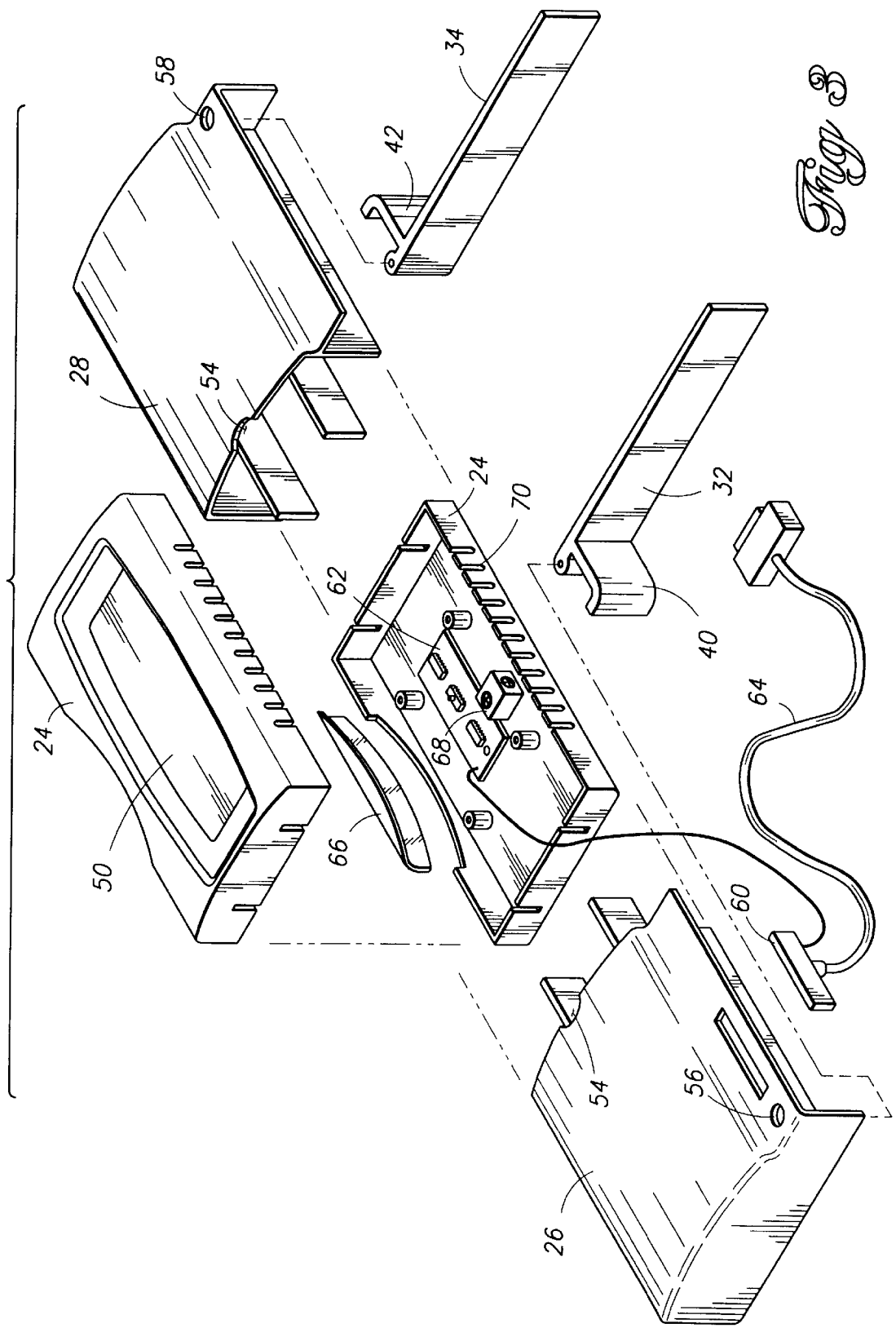
FIG. 3 is an isometric, exploded view of the display adapter.

FIG. 3 shows the adapter 20 in a disassembled condition. The adapter 20 has a printed circuit board (PCB) 62 housed within the body 24. The connector 60, PCB 62, and a parallel conductor cable 64 provide electronic interfacing circuitry to interface the display with a computing unit. In this particular implementation, the PCB 62 supports a remote signal receiving port to receive remotely transmitted signals (e.g., IR, RF, etc.) from the remote control handset 52. As one example, the PCB 62 has an IR receiver port to receive IR signals generated by the IR handset 52. An IR cap or lens 66, which is formed of a material transparent to IR signals, is assembled as part of the body 24. During the presentation, the IR handset 52 transmits IR signals to the adapter 20, which converts the IR signals to digital signals that are passed over the conductor 64 to the computer.

A fan 68 may optionally be mounted within the body 24 to blow air out through an air grate 70 (FIG. 2) to circulate air beside the adapter body and between the support arms 32, 34. This air circulation helps cool the display and projector light surface. However, the enclosure design may facilitate sufficient circulation without a fan because the enclosure, in the illustrated implementation, supports only three sides of the display, leaving a fourth side open. Moreover, the support arms maintain the display at a spaced distance from the projector light surface. Accordingly, air circulation through the opened fourth side and in the gap between the display and projector light surface may be sufficient to maintain a safe operating temperature. It is noted that if a fan is incorporated into the enclosure, the adapter may also be equipped with a power cord to supply power to the fan, or configured to receive power from the portable computer.

FIG. 4 shows the adapter 20 being used with a laptop computer 80 to form a computerized projector display for an overhead projector 100. The computer 80 has a CPU unit 82 and a detachable display 84, such as an LCD screen, which can be detached from the CPU 82. The display 84 has a detachable backlight cover 86 which is removed to convert the monitor into a projector panel. U.S. Pat. No. 5,041,965 to Chen describes a suitable laptop computer with detachable display. This patent is hereby incorporated by reference.

To set up the adapter 20 for a presentation, the presenter extends the sleeves 26, 28 to the expanded position and folds out the support arms 32, 34 to the opened position. The adapter 20 is then placed over one entire side of the projector light surface. Next, the display 84 is detached from the laptop CPU 82 and the back cover 86 is removed. The display 84 has posts 88 and 90 which are inserted respectively into mounting apertures 56 and 58 of the adapter 20 to physically mount the display onto the adapter. During this physical engagement, the electrical connector 60 on the adapter 20 mates with a compatible connector on the display 84 (not shown, but located beside the post 88) to provide an electronic coupling between the adapter 20 and the display 84. The display is then tilted 90° as indicated by arrow 92 to a horizontal orientation to rest on the support arms 32, 34. The support arms support the display 84 a spaced distance above a light surface 102 of the overhead projector 100 to prevent overheating. Notice that the extended sleeves 26, 28 cover one entire side area of the projector light surface 102 adjacent to the display. Together, the adapter 20 and display 84 cover the entire projector light surface to prevent formation of peripheral bright spots on the projection screen.

The presenter couples the adapter cable 64 to the parallel port of the laptop CPU 82. The presenter removes the IR handset 52 from the recess 50 and uses it to control the presentation. More specifically, the presenter directs the IR handset 52 toward the IR receiver port on the PCB 62 housed within body 24 behind IR lens 66. The IR receiver converts the optical signals to digital signals, which are then transmitted over cable 64 to the computer CPU 82. These digital signals contain control information for managing the presentation software executing on the computer.

Following a presentation, the presenter decouples the cable 64 from the laptop CPU 82 and replaces the IR handset 52 in the adapter recess 50. The presenter removes the display 84 from the adapter and reattaches it to the computer CPU 82. The presenter folds the support arms 32, 34 back along side the adapter 20 to the closed position and slides the sleeves 26, 28 back over the body 24 to the collapsed position. The compact adapter is then ready for easy portability with the laptop computer.

Although the example of FIG. 4 shows a laptop computer with detachable display, the adapter can be used with other types of displays. Additionally, other forms of computers can be substituted for the laptop, such as notebook and sub-notebook computers.

The adapter is advantageous because it incorporates all of the functions and items needed for a computerized overhead projection presentation into a light weight and highly compactible device which is easy to transport. For mobile people, compact size is beneficial for travel convenience and integration of components is beneficial from a standpoint of remembering all of the items used in the presentation. The display adapter can be used with a laptop computer, an item normally employed in computerized presentations. The adapter integrates the physical support mechanism which supports the laptop display a safe distance above the projector light surface (i.e., to prevent overheating) with the electronics and IR components used to operate the computerized presentation. Additionally, since the adapter does not have its own LCD screen, the adapter is comparatively less expensive compared to traditional computerized projector display panels.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A display adapter for adapting a display for use with an overhead projector, comprising:

a body;

first and second extendible sleeves slidably mounted to the body to move between an expanded position in which the sleeves are extended outward from the body in opposing directions and a collapsed position in which the sleeves are slid inward relative to the body toward each other; and first and second support arms movably mounted to the first and second sleeves, respectively, to move between an open position in which the support arms are used to support the display and a closed position.

2. A display adapter as recited in claim 1, wherein the first and second support arms support the display a spaced distance from a light surface of the overhead projector.

3. A display adapter as recited in claim 1, wherein the first and second support arms are pivotally mounted to the first and second sleeves, respectively.

4. A display adapter as recited in claim 1, wherein:

the first and second sleeves are mounted to slide along a first axis; and the first and second support arms are pivotally mounted to the first and second sleeves, respectively, about pivot axes that are transverse to the first axis.

5. A display adapter as recited in claim 1, wherein the body has a recess formed therein, the recess being sized to hold a remote control handset.

6. A display adapter as recited in claim 1, wherein:

the body has a recess formed therein, the recess being sized to hold a remote control handset; and the first and second sleeves expose the recess in the expanded position and cover at least part of the recess in the collapsed position.

7. A display adapter as recited in claim 6, wherein at least one of the sleeves has a view opening formed therein to provide a view of the recess formed in the body when the first and second sleeves are in the collapsed position.

8. A display adapter as recited in claim 1, further comprising:

an electrical connector to connect with a compatible connector on the display; and electronic interfacing circuitry mounted within one of the body, the first sleeve, or the second sleeve and coupled to the connector to interface the display with a computing unit.

9. A display adapter as recited in claim 1, further comprising a remote signal receiver port formed in one of the body, the first sleeve, or the second sleeve to receive remotely transmitted signals generated by a remote control device.

10. A display adapter as recited in claim 1, further comprising a fan mounted within one of the body, the first sleeve, or the second sleeve to circulate air about the adapter for cooling the display.

11. A display adapter adapting a display for use with an overhead projector, comprising:

a body;

a recess formed in the body to hold a remote control handset;

first and second extendible sleeves slidably mounted to the body to move between an expanded position in which the sleeves are extended outward from the body in opposing directions to expose the recess and a collapsed position in which the sleeves are slid inward relative to the body toward each other to cover at least part of the recess; and first and second support arms movably mounted to the first and second sleeves, respectively, to move between an open position in which the support arms are used to support the display and a closed position.

12. A display adapter as recited in claim 11, wherein:

the first and second sleeves are mounted to slide along a first axis; and the first and second support arms are pivotally mounted to the first and second sleeves, respectively, about pivot axes that are transverse to the first axis.

13. A display adapter as recited in claim 11, wherein at least one of the sleeves has an opening formed therein to provide a view of the recess when the first and second sleeves are in the collapsed position.

14. A display adapter as recited in claim 11, further comprising a remote control handset sized to rest within the recess.

15. A display adapter as recited in claim 11, further comprising an IR port formed in the body to receive IR signals generated by a IR device, the IR port being exposed when the sleeves are in the expanded position and at least partially covered when the sleeves are in the collapsed position.

16. A display adapter as recited in claim 11, further comprising:

an electrical connector to connect with a compatible connector on the display; and electronic interfacing circuitry mounted within the body and coupled to the connector to interface the display with a computing unit.

17. A display adapter as recited in claim 11, further comprising a fan mounted within the body to circulate air about the adapter for cooling the display.

18. A display adapter for adapting a display for use with an overhead projector, comprising:

an enclosure having a body, first and second extendible sleeves slidably mounted to the body to move between an expanded position and a collapsed position, and first and second support arms movably mounted to the first and second sleeves, respectively, to move between an opened position and a closed position;

an electrical connector mounted within the enclosure to connect to a compatible connector on the display;

electronic interfacing circuitry mounted within the enclosure and coupled to the connector to interface the display with a computing unit;

a remote control device removably housed by the enclosure; and a remote control receiver port formed in the enclosure to receive remotely transmitted signals generated by the remote control device.

19. A display adapter as recited in claim 18, wherein:

the body has a recess to hold the remote control device; and in the expanded position, the first and second sleeves expose the recess to permit removal of the remote control device from the body recess and replacement of the remote control device into the body recess; and in the collapsed position, the first and second sleeves cover at least part of the remote control device when housed within the body recess.

20. A display adapter as recited in claim 18, wherein:

the first and second sleeves are mounted to slide along a first axis; and the first and second support arms are pivotally mounted to the first and second sleeves, respectively, about pivot axes that are transverse to the first axis.

\* \* \* \* \*